United States Patent

[11] 3,631,721

[72] Inventors: Bernard Nollen, Hamburg-Marienthal; Hans Schuhmann, Schlat, both of Germany
[21] Appl. No.: 887,891
[22] Filed: Dec. 24, 1969
[45] Patented: Jan. 4, 1972
[73] Assignee: Internationaler Dienst fur Betriebsberatung und Marktforschung GmbH
[32] Priority: Jan. 2, 1969
[33] Germany
[31] P 19 00 088.5

[54] CLINICAL THERMOMETER OF SYNTHETIC MATERIAL USING NONTOXIC THERMOMETRIC MATERIAL
8 Claims, 4 Drawing Figs.

[52] U.S. Cl. ............................................ 73/368.3, 73/371
[51] Int. Cl. ............................................ G01k 5/32, G01k 1/04, G01k 5/14
[50] Field of Search ............................................ 73/372, 371, 374, 368.2, 368, 368.3, 368.4, 358; 240/2.25

[56] References Cited
UNITED STATES PATENTS

| | | | |
|---|---|---|---|
| 1,942,857 | 1/1934 | Hickman | 73/371 |
| 2,723,564 | 11/1955 | Juchheim | 73/371 |
| 3,001,401 | 9/1961 | Vernet et al. | 73/368.3 X |
| 3,218,861 | 11/1965 | Moore et al. | 73/371 |

FOREIGN PATENTS

| 678,246 | 8/1952 | Great Britain | 73/371 |
|---|---|---|---|

Primary Examiner—Louis R. Prince
Assistant Examiner—Daniel M. Yasich
Attorney—Beaman & Beaman ABSTRACT: The thermometer comprises a bulb with a capillary tube of highly transparent plastic material. The thermometric substance in the bulb is a mixture of crystalline organic compounds with melting points lying close to each other, i.e. a mixture of eicosane, heneicosane and docosane. The indicating liquid in the capillary tube is separated from the thermometric substance by a diaphragm. The temperature range of the thermometer can be varied by suitable selection of the organic compounds and by additives. The thermometer can be manufactured from plastic material.

PATENTED JAN 4 1972
3,631,721
Fig. 1    Fig. 2    Fig. 4
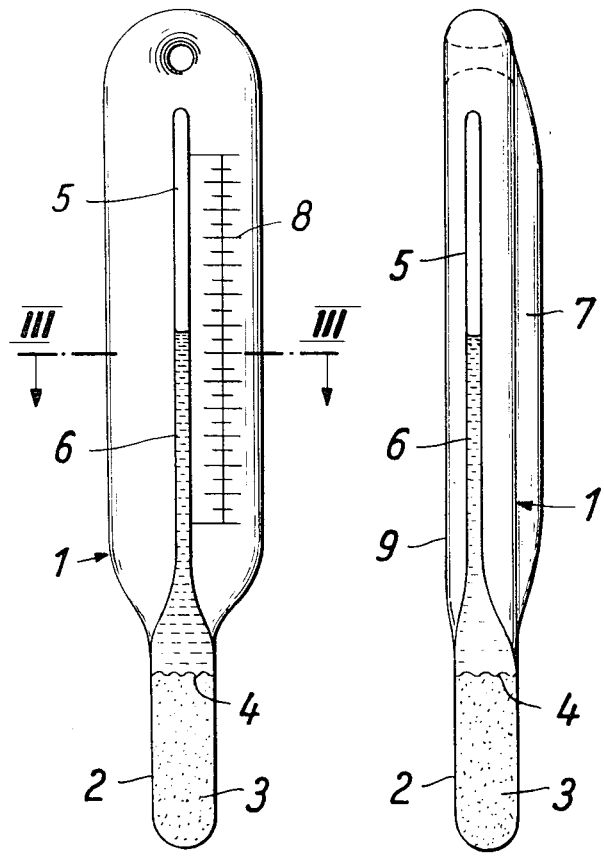
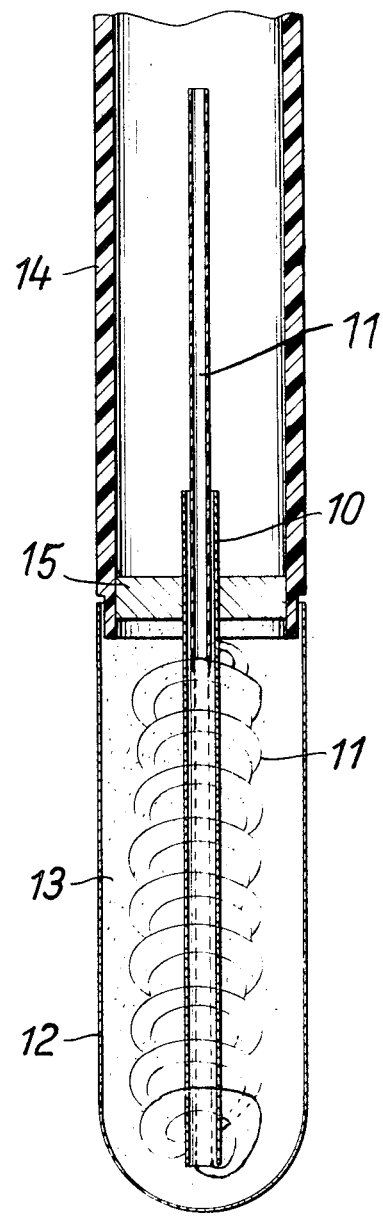
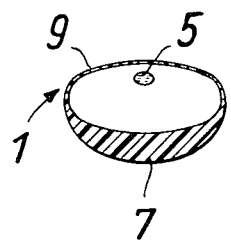
Fig. 3
INVENTORS
Bernard Nollen
Hans Schuhmann
By Beaman & Beaman
attys

' # 3,631,721

CLINICAL THERMOMETER OF SYNTHETIC MATERIAL USING NONTOXIC THERMOMETRIC MATERIAL

BACKGROUND OF THE INVENTION

The present invention is concerned with a thermometer working on the basis of volume expansion of a medium and consisting of a highly transparent plastic material.

The thermometers generally used in various industries and in laboratories are as a rule based on volume expansion of certain liquid elements or chemical compounds with rise of temperature. These liquids are enclosed in capillary tubes which are mostly surrounded by a protective sleeve. The graduation is provided either directly on the capillary tube or on a special scale disk. If necessary, the liquids are colored in order to improve visibility.

Thermometers of this type are characterized by their simple construction and may be easily produced and can be adapted to most various uses. For example, clinical thermometers are preferably used in the form of mercury columns in glass sleeves, because this metal expands considerably in the temperature range in question for this purpose, and the mercury column is well visible through glass.

What is disadvantageous with these thermometers is that the glass sleeve easily breaks and the toxic mercury may run out. In addition, such constructions are relatively expensive. Plastics have as yet not been used in replacement of the glass because they have coefficients of thermal expansion that are too high, thus rendering the measuring operation considerably more difficult if not impossible. In addition, with the elements and chemical compounds having been used so far as thermometric fillings, and with measurings to be effected within a narrow range of temperature one has been compelled to use capillary tubes of very small caliber, in order to make possible sufficiently exact readings. But for such capillary tubes, up to now, plastics have proved to be less suitable.

SUMMARY OF THE INVENTION

An object of the present invention is to provide a thermometer out of highly transparent synthetic plastics, especially an unbreakable thermometer which, however, is well readable and may be easily and economically produced. Another object of the invention is to provide a substance for the filling of a thermometer out of highly transparent plastic material which is well readable and may be easily and economically produced. Another object of the invention is to provide a thermometer body which is particularly suited for this filling. It is furthermore an object of the invention to provide a special embodiment of the filling so that it may be used in known thermometers.

It has now unexpectedly been found that certain crystalline organic compounds which vary considerably in volume in the region of the melting point thereof, are suitable as thermometric filling materials. The invention is based on the idea to use such materials in the thermometry, their changes in volume in dependence from temperature being transmitted in a suitable manner, preferably via a diaphragm, to an incompressible liquid with variable meniscus whereby these volume changes are made visible.

It has been found that paraffins contained in tar from low-temperature carbonization are characterized by an especially great volume contraction in the transition from the liquid to the solid state. In order to cover a certain range of temperature, in accordance with the invention, use is made of a mixture of several crystalline compounds with its melting points being close to each other, for instance a mixture of successive members of a homologous series of organic compounds. These thermometric filling substances have melting ranges of 5° C. and more with sufficient change in volume. If necessary, the melting range may still be enlarged in a manner known per se by admixture of certain soluble substances. If thus, a suitable mixture of crystalline substances is already present, a lowering of the melting point may still be effected according to the cryoscopic constant by the addition of a soluble admixture component. If especially low melting points are desired, eutectic mixtures may be prepared with different organic compounds.

With the thermometer in accordance with the invention the thermal expansion of the indicating liquid itself in the capillary tube is without importance. The amount by which the indicating liquid is displaced, is the only decisive factor. Even such substances may be preferably used as indicator liquids which have the same coefficient of thermal expansion as the material of the jacket or the capillary tube. With this, it has been rendered possible to use plastics instead of glass which, as mentioned above, could not be used previously because of their more or less great heat expansion coefficient.

The present invention thus relates to a thermometer working on the basis of thermal volume expansion and made of highly transparent plastic material, which is characterized by a filling substance consisting of microcrystalline organic compounds with melting points lying close to each other, and an indicating liquid disposed above said filling substance in a manner known per se and separated from the filling substance by a diaphragm.

As most of the respective organic crystalline compounds are poor thermal conductors and a rapid temperature indication is desired, in accordance with the invention, a dispersion with well heat-conductive material, for example, aluminum powder or aluminum spangle is employed. Also the bulb containing the mixture will have to be made of a good heat-conductive material, for instance aluminum, copper or silver.

The thermometer filling substance may have a composition based on the following basic formula:

50 parts eicosane $C_{20}H_2$ m.p. 37° C.
30 parts heneicosane $C_{21}H_4$ m.p. 40.4° C.
20 parts docosane $C_{22}H_{46}$ m.p. 44.4° C.

This mixture shows a volume change of about 11 percent in the transition from the solid to the liquid state. To enlarge the range of temperatures, this basic formula may have added thereto certain additives. M-dinitrobenzene is suited to increase the melting temperature; the change in volume then will be 11.88 percent. A lowering of the melting temperature is obtained by the addition of p-toluidine; the mixture then has a volume change of 9.2 percent. Additives furthermore suited to enlarge the melting range to 36.5° to 44.5° C. include the following compounds: camphor, benzene, acetone, methol, salicylic acid phenyl ester, cyanamide, carbonic acid ethyl ester, dimethoxy aniline and o-terphenyl.

A stabilized solution of 3 percent methyl cellulose in water, colored with a dyestuff, or a polyglycolether with some dyestuff added, for example, are best suited as indicating liquids.

As synthetic plastic materials for the capillary tube and the sleeve, highly transparent plastics are to be used. The sleeve preferably consists of a polycarbonate or acrylic glass, i.e., of plastics materials, which are easy to process and cheap to produce. The capillary tube must be made of a plastic material resistant to chemical agents, for instance, polycarbonate or polytetrafluorethylene. The bulb or other case containing the wax/metal dispersion is made of purest aluminum the inner wall of which is coated with polytetrafluorethylene. A foil made of plastic material resistant to chemical agents, for instance, polychloroprene or chlorosulfonated polyethylene serves as a diaphragm.

The present invention provides a thermometer which constitutes an essential technical progress in that it is unbreakable, has a nontoxic filling substance and the production costs thereof are low. So it is possible to use it only once and then to throw it away. This is of great value especially in connection with clinical thermometers. The thermometers may be supplied in a sterilized condition, and as they may be thrown away after use, disinfection may be dispensed with, which, however, does not exclude that they may be kept, if desired, also in disinfectant solutions for reuse.

Further possible embodiments of the thermometer in accordance with the invention have already been described above, i.e., a thermometer provided with a filling substance consisting of several crystalline organic compounds and in which, in case of an increase in temperature, the expansion in volume is transmitted to an indicating liquid. Another improved embodiment of the thermometer is characterized by an aluminum tube having a hose wrapped around the lower portion thereof which is filled with the indicating liquid, the one end of said hose being pasted and the other end pulled upwardly from below through the interior of the tube; a one-side closed aluminum sleeve filled with the temperature-responsive filling material into which the portion of the tube having the hose coil wrapped therearound projects; and a plastic tube placed on the sleeve and comprising at its lower end a stopper provided with a bore for the aluminum tube.

BRIEF DESCRIPTION OF THE DRAWING

FIG. 1 shows a front view of a first embodiment of the thermometer according to the invention, FIG. 2 shows a side view of the first embodiment of the thermometer according to the invention, FIG. 3 shows a cross-sectional view along line III—III of FIG. 1 and FIG. 4 shows a schematic representation of a second embodiment of the thermometer according to the invention.

DESCRIPTION OF THE PREFERRED EMBODIMENTS

As will be seen from the attached drawings comprising the FIGS. 1 to 3, the thermometer in accordance with the invention consists of an outer socket 1 with the wax/metal mixture 3 disposed in the lower portion 2 thereof. This mixture is separated from the indicating liquid 6 standing thereabove in a tube 5 formed upwardly into a capillary tube, by a diaphragm 4. So that the meniscus of the liquid 6 does not tear off, a highly viscous indicator liquid and a capillary tube of a plastic material which is not wetted by the liquid, are provided. It is possible to fix the measured value if the capillary tube is evacuated and restricted in the lower region thereof. The indicator liquid column may then tear off. But it is also possible to use a small bulb in an open system or a superposed liquid column, however, the two liquids must not intermix. A superposed bulb also renders unnecessary the casting-down after having taken a reading because here a simple mechanical movement will suffice in order to bring the liquid back into its starting position. Also the outer tube which serves as a protective socket may be made of plastic material. In this case, it is possible to form this tube in such a manner that the liquid column is magnified. In this connection, attention is drawn to FIGS. 2 and 3 which show a thermometer with a magnifying lens 7 formed in the protective sleeve thereof. Hereby, the reading is especially facilitated. It is possible to add to the indicating liquid a fluorescent substance and luminous paint, respectively, which makes possible a reading also with very poor illumination. The scale 8 may be impressed on the plastic material outer sleeve after mounting, whereby the calibration may be automatized and a relatively high accuracy may be obtained. On the backside 9 of the thermometer an especially prepared layer may be provided which makes it possible for the user to write down the readings or the like.

The second embodiment of the thermometer and the fabrication thereof, respectively, will be described herebelow with reference to FIG. 4 of the drawing.

The hose 11 consists of a plastic material such as polycarbonate or polytetrafluorethylene polymer resistant against chemical agents. In a preferred embodiment, said hose has an inner diameter of about 0.5 mm. and a wall thickness of about 0.1 mm. This hose is filled with the indicating liquid and wrapped around the lower portion of the aluminum tube 10, so that a coil comprising two layers each having approximately 30 turns is formed. The one end of the hose 11 is suitably adhered to the aluminum tube 10. The other end of the hose 11 is pulled upwardly from below through the tube 10 and extends above tube 10 and is located in the tube 14. That portion of the tube 10 having the hose 11 wrapped therearound is introduced into an aluminum sleeve 12 closed at the bottom, and filled up with the temperature-responsive filling material 13. The aluminum sleeve 12 is thin walled, the wall thickness may lie at about 0.2 mm., and the height is such that it slightly exceeds the length of the hose coil; the width of the aluminum sleeve in the preferred embodiment of the invention is about 5 mm. A plastic tube 14 is then placed onto the aluminum sleeve 12 filled with the filling material 13. A stopper 15 is provided in the lower end of the tube 14 with a bore for the tube 10 to be pushed therethrough. Finally, the free end of the plastic hose 11 is out to the necessary length and the excessive indicating fluid is removed. The scale may then be provided in the interior of the plastic tube 14 or applied later on on the outside thereof.

As may be seen from the specification hereabove and from FIG. 4 of the drawing, the thermometer proposed is of a most simple and most economical construction. A quick transfer of heat and an extremely quick and safe indication of temperature is guaranteed by the provision of the indicating fluid in a thin plastic hose, a considerable length of which is embedded in the filling material. The thermometer with the above-indicated dimensions is so small that it may be employed to advantage for scientific purposes wherever temperatures are to be determined at smallest areas. Of course, the thermometer may be made at any desired scale adapted to the respective use.

Another embodiment of the invention relates to a thermometer filling according to the invention which may be inserted into thermometers of known constructions.

The known thermometer constructions, in which the lower part is spherically shaped or oval, and the part thereabove is formed as a capillary tube, are not suited for the thermometer fillings in accordance with the invention, i.e., solid materials, which expand during the melting The solid material, i.e., the wax, must not be allowed to extend into the capillary tube. Moreover, the interface between the wax and the indicating liquid must still lie within the lower wide portion (bulb) of the thermometer, because otherwise the volume change of the filling material might lead to destruction of the ball-shaped bulb. MOreover, a narrow capillary tube cannot spontaneously provide room to the expansion in volume.

It has been found that thermometers of the known construction, such as, for example, ball-type thermometers, may be used for thermometer fillings according to the invention if the crystalline organic compounds are dispersed in a noncompressible liquid with which they cannot be mixed. Preferably, the crystalline organic compounds are finely dispersed and encased with a thin skin, for instance, an elastic plastic foil. It is also possible to press the organic crystalline substances through a nozzle into a thin elastic hose and bring this hose into the liquid in the form of a skein.

The invention thus relates to a thermometer made of a plastics material based on thermal expansion of a filling material consisting of several crystalline organic compounds having melting points lying close to each other, and with a liquid disposed thereabove separated from the filling substance by a diaphragm. The invention is characterized in that the crystalline organic compounds are dispersed in a noncompressible liquid immiscible with the organic compounds. The crystalline organic compounds are either encased by a thin elastic skin when in a finely divided condition or by a thin elastic hose when in the form of a filament of very small diameter. The dispersion may contain one or several additional compound(s) by which the melting point of the crystalline substances is reduced. The liquid in which the crystalline substances are dispersed, is preferably water, a higher boiling alcohol or a glycol ether. The thermal expansion in volume is independent of whether the solid compounds are present in a compact state or as a dispersion, however, when the solid compounds are present in the form of small particles in a liquid, the thermal expansion in volume may take place spontaneously also in a narrow capillary tube, because the dispersion liquid may immediately move on upwardly into the capillary tube in correspondence with the increase in volume, while in the case of a mass of melting paraffins a longer period of time will be necessary for this.

Suitably, the capillary tube of the thermometer is designed in two parts, one of said parts having a greater diameter than the other, with that one of the parts having a greater diameter containing the dispersion or, after melting the crystalline compounds, the emulsion, and that portion having the smaller diameter containing the indicating liquid. By such an arrangement, the indicating accuracy may still more be increased.

What we claim is:

1. A clinical thermometer characterized by its economy of manufacture and nontoxic characteristics comprising, in combination, a hollow bulb, a flexible diaphragm disposed in said bulb separating said bulb into first and second chambers, a capillary tube formed of transparent synthetic plastic material communicating with said first chamber, an indicating liquid filling said first chamber receivable within said capillary tube, and a nontoxic thermometric material filling said second chamber having a volume determined by the temperature of said material, said thermometric material containing a mixture of crystalline organic compounds having closely related melting points.

2. In a clinical thermometer as in claim 1 wherein said thermometric material consists of a mixture of eicosane, heneicosane and docosane.

3. In a clinical thermometer as in claim 1 wherein said diaphragm comprises a compressible transparent hose within said bulb, said capillary tube comprising an extension of said hose.

4. In a clinical thermometer as in claim 3, a substantially rigid tube located within said bulb having a first end within said thermometric material and a second end exterior of said bulb, said compressible hose being coiled about said rigid tube, and said extension of said hose constituting said capillary tube being inserted into said rigid tube first end and extending from said tube second end.

5. A thermometer in accordance with claim 1, wherein said crystalline organic compounds have added thereto one or several compounds broadening the melting point range.

6. A thermometer in accordance with claim 1, wherein a highly thermally conductive material p.e. aluminum powder, is dispersed in said mixture of organic compounds.

7. A thermometer in accordance with claim 1, wherein said bulb consists of aluminum coated on the inside thereof with polytetrafluorethylene.

8. A thermometer in accordance with claim 1, wherein said capillary tube is enclosed by a socket made of highly transparent synthetic plastic.

* * * * *